United States Patent [19]

Saito et al.

[11] 4,381,456

[45] Apr. 26, 1983

[54] INPUT INTERFACE UNIT FOR PROGRAMMABLE LOGIC CONTROLLER

[75] Inventors: Yoshitane Saito; Akihiro Yamada; Satoshi Yano, all of Nagaokakyo, Japan

[73] Assignee: Omron Tateisi Electronics Co., Kyoto, Japan

[21] Appl. No.: 245,684

[22] Filed: Mar. 19, 1981

[30] Foreign Application Priority Data

Mar. 19, 1980 [JP] Japan .................................. 55-35088

[51] Int. Cl.³ ........................ H02J 3/00; H01H 19/14
[52] U.S. Cl. ...................................... 307/40; 307/115
[58] Field of Search ........................ 307/40, 113, 115; 363/28, 40

[56] References Cited

U.S. PATENT DOCUMENTS 3,466,505 9/1969 Anderson ........................ 307/115 X
3,638,193 1/1972 Opferman et al. ................... 307/113

Primary Examiner—Donald A. Griffin
Attorney, Agent, or Firm—Cushman, Darby & Cushman

[57] ABSTRACT

The input interface unit of the present invention is equipped with plural input terminals to be connected to external switches respectively, plural output terminals to be connected to input bus lines running to a central control unit (CPU), and plural current-controlling input terminals. These input terminals are divided into plural groups, and the input terminals in each group are connected commonly to each other through pull-down resistors, and then connected through current-carrying switches independently grouped for each terminal group to a power supply equipment built in the unit. And each of these current-carrying switches can be selected and turned on or off for control in response to signals supplied from the central control unit to the current-controlling input terminals.

5 Claims, 3 Drawing Figures

INPUT INTERFACE UNIT FOR PROGRAMMABLE LOGIC CONTROLLER

BACKGROUND OF THE INVENTION

The present invention relates to an input interface unit for programmable logic controller which allows the currents to flow to only limited input terminals required in response to a predetermined timing for feeding input data into a central control unit (CPU).

Conventionally, in the input interface unit for programmable logic controller, its circuit is arranged so as to allow the current always to flow through external switches while these external switches (with or without contacts) connected to the input terminals are being closed, so that the capacity of its power supply circuit must be sufficiently large for delivering current even when all switches are closed at the same time. Therefore, if the number of input terminals increases, the capacity of the power supply circuit must be also increased accordingly, so that such an unit is extremely inconvenient in that compactness and reduction in weight of the unit becomes difficult or an external power supply equipment becomes necessary for the input interface unit. Also, if such an external power supply equipment is connected, isolation with photo couplers is needed for cutting off the noises from the outside but this will increase the cost and require more space for mounting the circuits since one coupler is needed for each input terminal.

SUMMARY OF THE INVENTION

An object of the present invention is to provide an input interface unit for programmable logic controller which is compact and lightweight and can be produced economically.

Another object of the present invention is to provide an input interface unit for programmable logic controller which can be connected to a number of external switches and consumes a low electric power.

Another object of the present invention is to provide an input interface unit for programmable logic controller which is capable to assure much longer life of contacts of external switches if the switches with contacts are used as the external switches.

Another object of the present invention is to provide an input interface unit for programmable logic controller which is capable to accurately deliver both opening and closing states of the external switch connected to each input terminal to the output terminals even if certain input terminals are mistakenly short-circuited outside the unit.

Another object of the present invention is to provide an input interface unit for programmable logic controller which is capable to maintain a proper response speed in operation even though some switching devices, into which stand-by currents are applied through the input terminals of the unit, are used as external switches.

It is a further object of the present invention to provide an input interface unit for programmable logic controller which is capable to supply the currents to limited and required input terminals of particular units desired when plural input interface units are connected to one central control unit (CPU).

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENT

Figure 1:
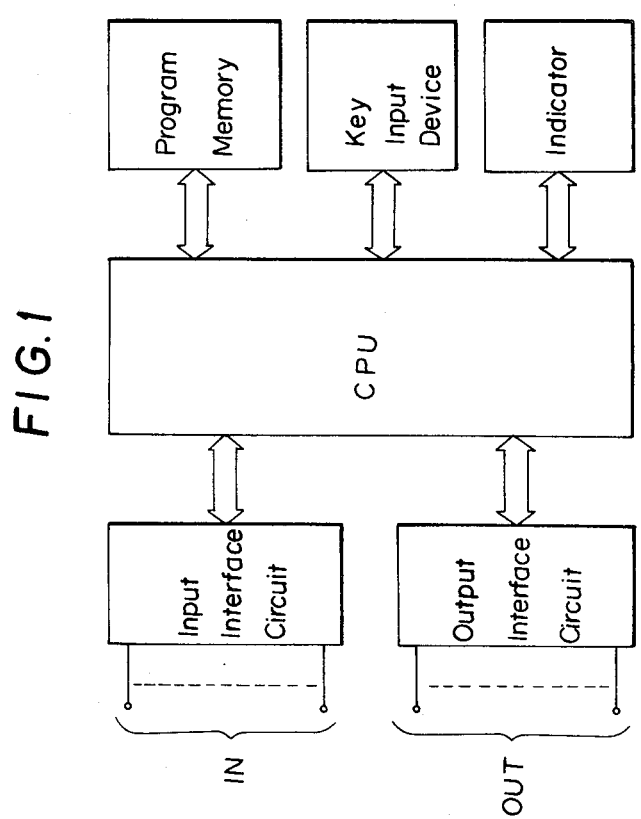
FIG. 1 is a block diagram indicating the whole of a programmable logic controller for which the present invention can be applied.

As indicated in FIG. 1, this programmable logic controller comprises a central control unit 1 consisting of a so-called microcomputer as hardware, an input interface circuit 2 having the functions of interface between external switches (with or without contacts) connected to each input terminal IN and the central control unit 1, an output interface circuit 3 which will control external equipments connected to each output terminal OUT in response to the output signal sent from the central control unit 1, a program memory 4 in which an user can store a predetermined program, a key input device 5 for writing program, and an indicator 6 for indicating input or output conditions.

The input interface circuit 2 comprises plural units (they will be called "input interface units" hereinafter), each housed in an independent housing though not illustrated in the figure. And each input interface unit is connected through input and control bus lines to the central control unit 1. Plural input terminals for connecting external switches (with or without contacts) are provided at each input interface unit.

Figure 2:
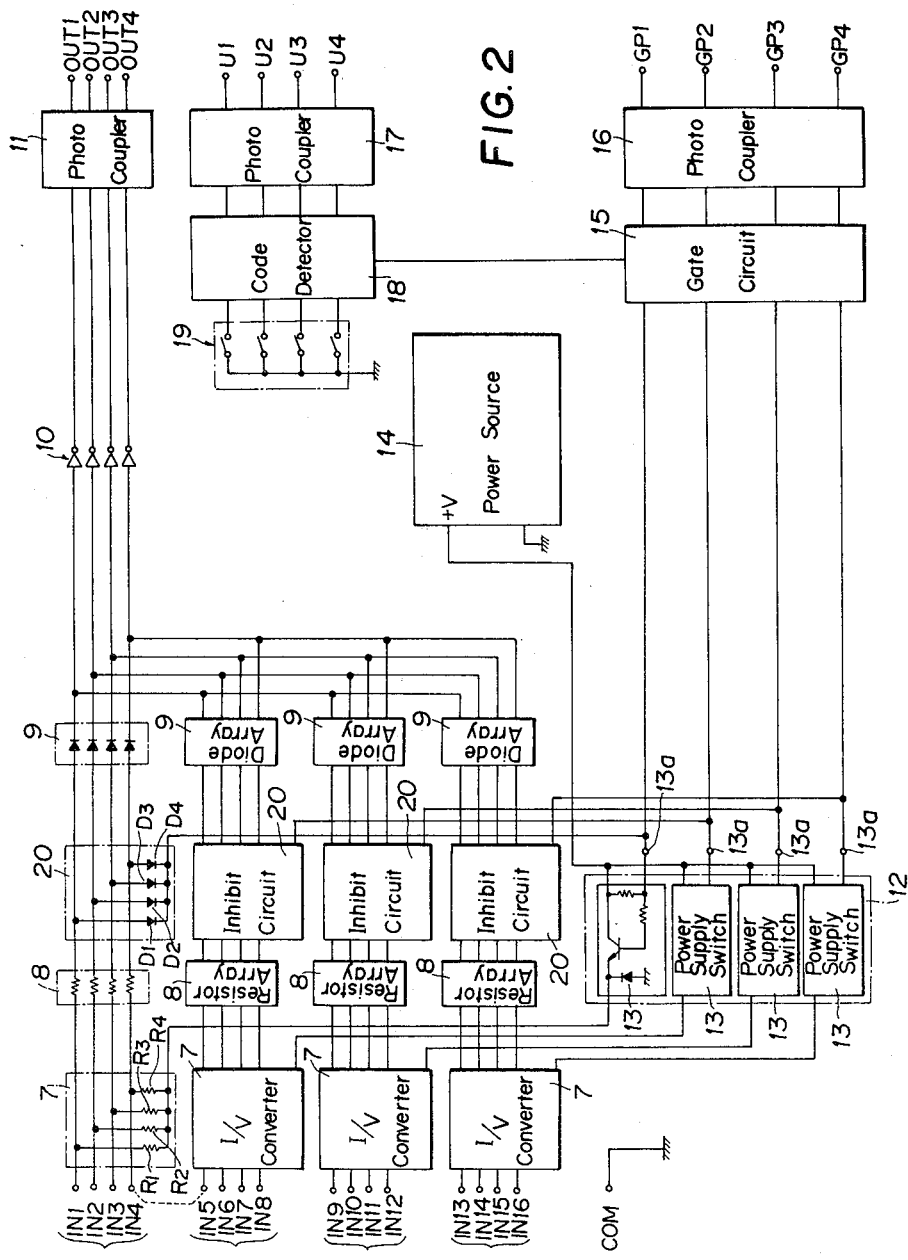
FIG. 2 is a block circuit diagram showing the detail of an input unit of the present invention.

FIG. 2 shows an embodiment of the input interface unit described above, where the input terminals are shown by IN1 to IN16, and external switches with or without contacts (not shown) are connected between these input terminals IN1 to IN16 and a common terminal COM. And, as indicated in the figure, these input terminals IN1 to IN16 are divided into four groups ranging from 1st group to 4th group. And the terminals in each group are connected to a I/V converter 7, a resistor array 8 and a diode array 9, and then connected to common lines which are common to remaining terminals in other groups. Then, these common lines are connected to amplifiers 10, a photo coupler 11 and then to output terminals OUT1 to OUT4.

I/V converter 7, as shown in the figure, is connected at an end of the converter to each input terminal, and lines from the terminals are connected at the opposite end to four pull-down resistors R1 to R4 respectively, all other lead wires of which are connected to a common terminal. Then, each common terminal of each converter is connected to a corresponding power supply switch 13 in a power control circuit 12, then to a line common to other remaining power supply switches, and to a power source 14 built in the housing.

As shown in the figure, the power supply switch 13 comprises a transistor switch and so forth, and its switching control terminal 13a is connected through a gate circuit 15 and a photo coupler 16 to a corresponding terminal of group assignment signal input terminals GP1 to GP4.

U1 to U4 are unit assignment signal input terminals which are connected through a photo coupler 17 to a code detector 18. This code detector 18 is so constructed that the gate circuit 15 will open its path when a set code of unit code setter 19 coincides with the contents of unit assignment signal.

On the other hand, inhibit circuits 20 are provided, each of which is so constructed that signals being transferred from I/V converter to the output terminals OUT1 to OUT4 can be inhibited there by the group. And, as indicated in the figure, each inhibit circuit 20 consists of four diodes D1 to D4 whose cathods are connected to a common line, and operates in such a manner that an inhibit state can be released in synchronization with opening and closing operation of the power supply switch 13 corresponding to a specific group of input terminals.

In the circuit configuration described above, if the contents of an unit assignment signal supplied through the control bus line (not shown) from the central control unit 1 to the unit assignment signal input terminal U1 to U4 do not coincide with the set code of the corresponding unit, the gate circuit 15 is closed and its output is retained in "L". Thus, all power supply switches 13 are closed, and no electric current flows to each I/V converter 7 even if either one of external switches connected to the input terminals IN1 to IN16 is in closed state.

On the contrary, when the contents of the unit assignment signal coincide with the set code of the corresponding input unit, a coincidence condition will occur at the code detector 18 and the gate circuit 15 opens, then a group assignment signal being transferred at that time from the central control unit 1 will pass through the gate circuit 15 and be supplied to each power supply switch 13 in the power control circuit 12. If, at that time, either one of bits of the 4-bit signal being transferred from the gate circuit 15 is in "H" state, only the power supply switch 13 corresponding to that bit will open, resulting in a supply of electric power only to a corresponding I/V converter 7 and a generation of logic signal voltage indicating the open or close condition of the external switch connected to an input terminal at the I/V converter 7. However, since the inhibit condition of the inhibit circuit 20 corresponding to a particular terminal group has been positively released at that time, the output signal from said I/V converter 7 is transferred through the resistor array 8, inhibit circuit 20, diode array 9, amplifier 10 and photo coupler 11 to the output terminals OUT1 to OUT4 and then to the central control unit 1.

According to this embodiment, the input terminals IN1 to IN16 are divided into four groups, and an independent I/V converter 7 is provided for each terminal group. In addition, electric power supply to each I/V converter 7 is normally inhibited by each corresponding power supply switch 13, and is permitted only when the unit assignment signal assigning a particular input unit from the central control unit 1 and the group assignment signal corresponding to the input terminal for the input unit are sent out. Therefore, even if all external switches connected to the input terminals IN1 to IN16 are closed, no electric power is consumed by any of I/V converters 7 unless the corresponding unit has been first assigned by the central control unit 1. On the other hand, since the power is supplied only to one of I/V converters 7 even if the corresponding input unit has been assigned by the central control unit 1 (because only one terminal group is selected at a time by the software in the central control unit), the capacity of the power source 14 can be determined basing upon only one group of I/V converter even if the number of the input terminals is increased further. Therefore, this embodiment of the present invention is capable to maintain the capacity of the power source 14 to a minimum even though the number of the input terminals is increased, making it possible to provide a compact, lightweight, multiple input type, low cost input unit of this kind.

In addition to the effects and features in the area of power consumption stated hereinbefore, this embodiment of the present invention will provide other additional features in the area of operation of circuit.

That is, the inhibit circuit 20 is installed at the output side of each I/V converter as stated above, and this inhibit circuit is so constructed that its operation to release the inhibit state is performed in synchronization with the signal (that is, the group assignment signal) which operates the I/V converter 7 for the particular terminal group. That is, if an electric power is being supplied to an I/V converter 7, the inhibit state of the inhibit circuit 20 corresponding to the group is positively released while, on the contrary, the inhibit circuit 20 for the group is positively in inhibit state if the power is not being supplied to the corresponding I/V converter 7.

Therefore, for example, where each of 1st to 4th groups is sequentially assigned by the group assignment signal sent out from the central control unit 1 and the state of each of four input terminals is to be transferred in the form of four bits to the output terminals OUT1 to OUT4, the state of four input terminals of the assigned group only will be positively taken out to the output terminals OUT1 to OUT4. For example, if the input terminal IN4 of 1st group is mistakenly short-circuited to the input terminal IN5 of the 2nd group as shown by a broken line in FIG. 2 while the open and close conditions of external switches connected to the input terminals IN1 to IN4 of the 1st group are being transferred to the output terminals OUT1 to OUT4, any erroneous operation due to the short-circuit can be positively prevented in the present invention. This erroneous operation, if not prevented, may occur in such a manner that the logic of input terminal IN4 is transferred through the input terminal 5, I/V converter 7 of 2nd group, resistor array 8, inhibit circuit 20 and diode array 9 to the output terminal OUT1 since the output of each diode array 9 is connected in the form of "wired OR". That is, if the inhibit circuit 20 is not provided, and if the external switch connected to the input terminal IN1 is in "closed" state and the external switches connected to the input terminals IN4 and IN5 are all in "open" state, the output from the output terminal OUT1 becomes "0" because of the signal coming from the "open" state, instead of correctly becoming "1" in response to the "close" state of the terminal IN1. However, this kind of erroneous operation can be prevented by the presence of the inhibit circuit 20.

In addition, in the embodiment of the present invention, the life of contacts, if adopted, of the external switch connected to an input terminal can be greatly extended. That is, as already described with respect to the conventional type of input interface unit, if the power is supplied to the signal generating circuits at all times regardless of the timing for receiving the signal in conventional types of input interface units, each external switch is turned on or off while the voltage is being applied at all times, causing each contact of switch to be repeatedly damaged by arc, resulting in a short life of such contact. On the contrary, in this embodiment of the present invention, the life of the contact can be greatly extended since switching is performed without any voltage applied across each contact in most cases and, thus, without causing damage due to arc unless the timing of the external switch accidentaly coincides with the timing for receiving signal created by the central control unit.

Figure 3:
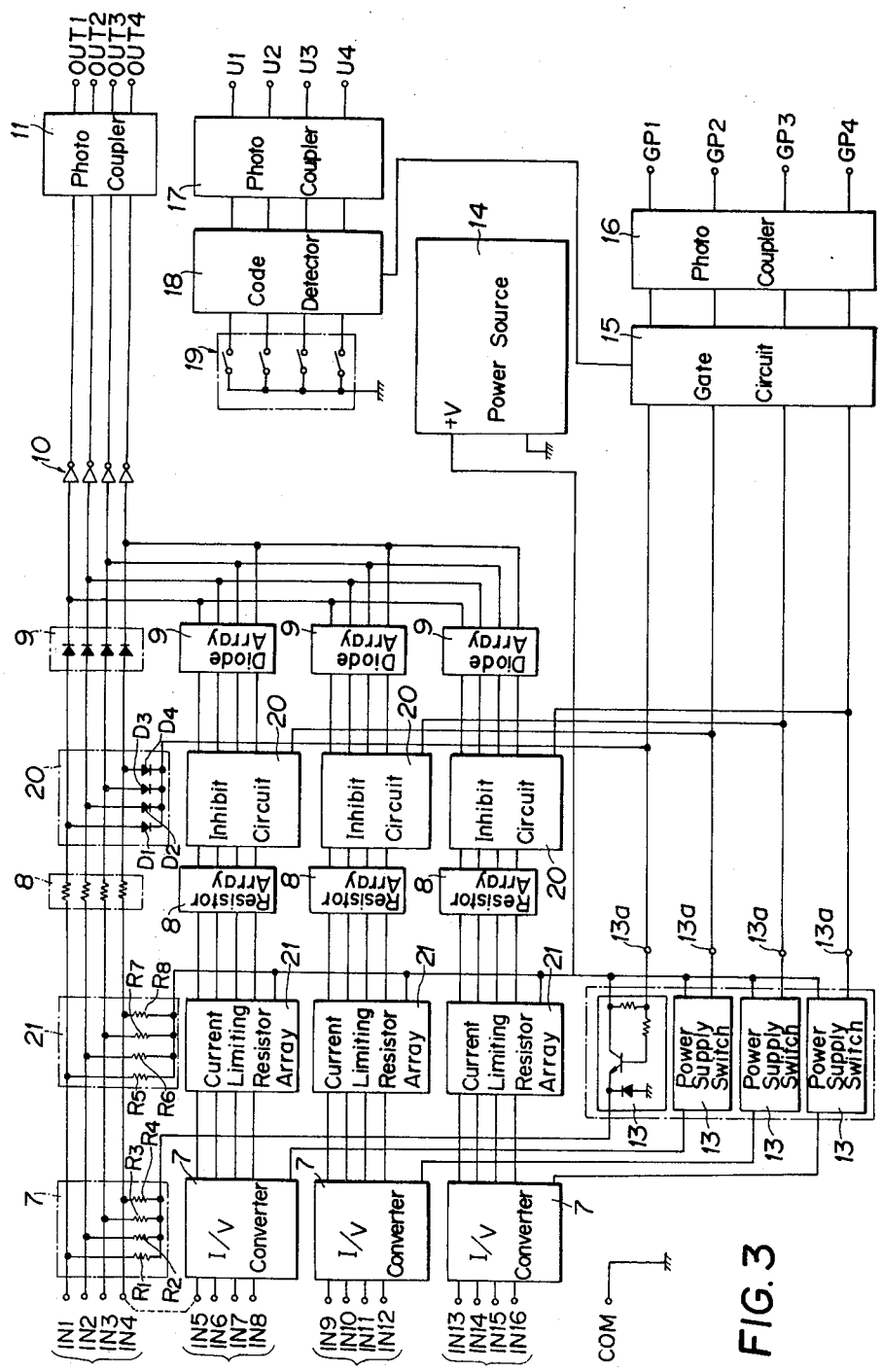
FIG. 3 is a block diagram showing another embodiment of the input unit of the present invention.

Now, another embodiment of the present invention will be described hereinafter by referring to FIG. 3.

In this input interface unit, a current-limiting resistor array 21 is connected between each I/V converter 7 and each resistor array 8. Each current-limiting resistor array 21 is connected at its end to each input terminal IN, and each line from the terminal is connected to a corresponding resistor of four resistors R5 to R8, other lead wires of which are connected to a common line for each terminal group. And each common line is directly connected to the power source 14. The resistance value K of each of resistors R5 to R8 is sufficiently large so that only an extremely low current will flow through each resistor even if an external switch connected to the input terminal is closed.

This input interface unit is very convenient when 2-wire type proximity switch, for instance, is used as the external switch. That is, 2-wire type proximity switch has a first closed circuit passing through a main switch and a second closed circuit passing through a sensor circuit both arranged in parallel between two external lead terminals, and said sensor circuit has a capacitor for maintaining a certain voltage when the main switch is closed. Therefore, there is a slight time delay in operation of 2-wire type proximity switch since said capacitor is charged until it becomes sensitive after the power voltage is supplied. Even though this 2-wire type proximity switch having the characteristics as stated above will be used in the input interface unit of the present invention, the problem of time delay in operation can be solved since said charging capacitor can be charged in advance with a small current supplied through the current-limiting resistors R5 to R8.

In all embodiments of the present invention described hereinbefore, 16 input terminals IN1 to IN16 are divided into four groups each having 4 terminals, and an independent I/V converter is provided for each group. However, the number of divided groups and the number of input terminals in a group are naturally not limited to those described hereinbefore. For example, 16 groups may be formed if needed and an independent I/V converter may be provided for each group. In addition, though four output terminals are used in the embodiments because the outputs from each terminal group are commonly connected through wired OR circuit, the outputs from each terminal group can be naturally taken out directly to 16 output terminals without installing the wired OR circuit. Also, though the gate circuit 15 is so arranged as to open or close by means of output from the code detector 18 for selecting the input units since the embodiments are arranged for a system having 16 input units, the code detector 18 and gate circuit 15 can be eliminated if only one input unit is needed in actual applications.

As many apparently widely different embodiments of this invention may be made without departing from the spirit and scope thereof, it is to be understood that the invention is not limited to the specific embodiments thereof except as defined in the appended claims.

We claim:

1. An input interface unit for a programmable logic controller comprising plural input terminals divided into plural groups to which external switches are to be connected; a current-voltage converter circuit provided for each of said groups of input terminals for converting current signals applied to each of said input terminals to voltage signals; plural output terminals connected to input bus lines of a central control unit (CPU) to which outputs from said current-voltage converter circuit are led; generating group assignment data input terminals connected to control bus lines of the central control unit (CPU), and a power supply controlling means which allows supply of power for converting operation only to said current-voltage converter circuit for specific terminal groups corresponding to the contents of the generating group assignment data applied to said generating group assignment data input terminals.

2. The input interface unit for programmable logic controller of claim 1, said power supply controlling means being capable of supplying small current through the input terminals at all times to external switches connected to said input terminals.

3. The input interface unit for programmable logic controller of claim 1, said generating group assignment data input terminals being composed of unit assignment data input terminals and group assignment data input terminals, and said power supply controlling means being capable of supplying the power for the converting operation only to a said current-voltage converting unit for the terminal group corresponding to the contents of data applied to said group assignment data input terminals only when the contents of data applied to said unit assignment data input terminals corresponds to the input interface unit.

4. The input interface unit for programmable logic controller of claim 1, said input interface unit being equipped with an inhibit circuit capable of inhibiting the transfer of the outputs from said current-voltage converter circuit to said output terminals except when the corresponding current-voltage converter circuit is in operation.

5. The input interface unit for a programmable logic controller of claim 1, wherein said power supply controlling means comprises a current-carrying switch capable of independently opening and closing in response to the contents of data applied to said generating group assignment data input terminals, these being located in a current-carrying path to each of said current-voltage converter circuits.

* * * * *